US005526473A

United States Patent [19]

Patel

[11] Patent Number: 5,526,473

[45] Date of Patent: Jun. 11, 1996

[54] METHOD OF AND APPARATUS FOR REDUCING THE SIZE OF A DISPLAY WHILE SUBSTANTIALLY MAINTAINING ITS INFORMATION CONTENT

[75] Inventor: Naran L. V. Patel, London, England

[73] Assignee: Marconi Instruments Limited, United Kingdom

[21] Appl. No.: 391,075

[22] Filed: Feb. 17, 1995

Related U.S. Application Data

[63] Continuation of Ser. No. 904,390, Jun. 25, 1992, abandoned.

[30] Foreign Application Priority Data

Jul. 1, 1991 [GB] United Kingdom .................. 9114177

[51] Int. Cl.$^6$ .................................................. G06T 3/00

[52] U.S. Cl. ........................................ 395/139; 395/140

[58] Field of Search ........................ 395/11.9, 127–133, 395/139, 140, 141, 142, 143; 382/47–53, 56; 364/DIG. 1, DIG. 2, 556, 569, 571.02; 324/115

[56] References Cited

U.S. PATENT DOCUMENTS

| | | | |
|---|---|---|---|
| 4,517,578 | 5/1985 | Tazaki | 395/139 X |
| 5,161,213 | 11/1992 | Knowlton | 395/128 |
| 5,371,842 | 12/1994 | Easton et al. | 395/142 X |

FOREIGN PATENT DOCUMENTS

| | | |
|---|---|---|
| 0137208 | 4/1985 | European Pat. Off. . |
| 0177640 | 4/1986 | European Pat. Off. . |
| 0179204 | 4/1986 | European Pat. Off. . |

*Primary Examiner*—Almis R. Jankus
*Attorney, Agent, or Firm*—Kirschstein et al.

[57] ABSTRACT

An apparatus for reducing display size whilst substantially maintaining display information content, the display comprising a graph plot of a number of data values, which plot extends in a first direction, each data value having an associated magnitude, the apparatus reducing the extent of the graph plot in the first direction. The apparatus comprises a digital signal processor (1), a data store (3), and a display system (5). The digital signal processor (1) comprises a program sequence unit (7), an arithmetic unit (9), and an address generator unit (11). The processor (1) divides up the data values into a series of groups of five adjacent data values each, selects from each group two data values having predetermined positions within that group for the purpose of preserving the presence in the graph plot of these two selected data values, and discards one of the three not selected data values from each group in dependence on the relative magnitudes of these three data values. The data store (3) stores the data values prior to the discarding of data values and the data values remaining after the discarding of data values. The display system (5) compresses in the first direction the graph plot of the remaining not discarded data values.

10 Claims, 2 Drawing Sheets

METHOD OF AND APPARATUS FOR REDUCING THE SIZE OF A DISPLAY WHILE SUBSTANTIALLY MAINTAINING ITS INFORMATION CONTENT

This is a continuation of application Ser. No. 07/904,390, filed on Jun. 25, 1992, now abandoned.

BACKGROUND OF THE INVENTION

1. Field of the Invention

This invention relates to a method of and apparatus for reducing the size of a display whilst substantially maintaining its information content.

It is desirable to be able to so reduce the size of a display. For example, if a display occupies the whole of an available display area, the aforesaid reduction in its size would free display area for the additional display of further information.

More particularly the invention relates to a method of and apparatus for reducing the size of a display whilst substantially maintaining its information content wherein the display comprises a plot in a first direction of a number of data values, and the extent of the display in the first direction is reduced by reducing the number of data values plotted.

2. Description of Related Art

In one known method of the above kind in a measurement instrument where the display is of the results of a series of measurements made by the instrument, the size of the display is reduced by reducing the number of measurements made and hence results to be displayed. However, this method requires, in addition to the making of the measurements for the original display, the subsequent making of the reduced number of measurements for the display of reduced size.

In another known method of the above kind where the reduction ratio, i.e. the ratio of the number of data values plotted in the original display to the number of data values plotted in the reduced size display, is an .integer, the data values plotted in the original display are divided up into a series of groups, each consisting of a number of data values equal to the reduction ratio. The data value of each group of the greatest magnitude is selected, alternatively from one group to the next the data values of the greatest and smallest magnitudes are alternately selected. The selected data values are then utilised to form the reduced size display. This method, however, can only be used when the reduction ratio is an integer, i.e. not a fraction.

SUMMARY OF THE INVENTION

It is an object of the present Invention to provide an improved method of and apparatus for reducing the size of a display whilst substantially maintaining its information content wherein the above problems are overcome.

According to a first aspect of the present invention there is provided a method of reducing the size of a display whilst substantially maintaining its information content, wherein the display comprises a plot in a first direction of a number of data values and the extent of the display in the first direction is reduced, said method comprising the steps of: dividing up the data values into a series of groups of adjacent data values; selecting from each group at least one data value having a predetermined position within that group; discarding at least one not selected data value from each group in dependence on the relative magnitudes of the data values of that group; and compressing in said first direction the display of the remaining not discarded data values.

According to a second aspect of the present invention there is provided an apparatus for reducing the size of a display whilst substantially maintaining its information content, wherein the display comprises a plot in a first direction of a number of data values and the extent of the display in the first direction is reduced, said apparatus comprising: processor means arranged to divide up the data values into a series of groups of adjacent data values, to select from each group at least one data value having a predetermined position within that group, and to discard at least one not selected data value from each group in dependence on the relative magnitudes of the data values of that group; memory means arranged to store the data values prior to the discarding of data values and to store the data values remaining after the discarding of data values; and display means arranged to compress in said first direction the display of the remaining not discarded data values.

BRIEF DESCRIPTION OF THE DRAWINGS

A method of and apparatus for reducing the size of a display whilst substantially maintaining its information content in accordance with the present invention will now be described, by way of example, with reference to the accompanying drawings, in which.

DETAILED DESCRIPTION OF THE PREFERRED EMBODIMENT

Figure 1:
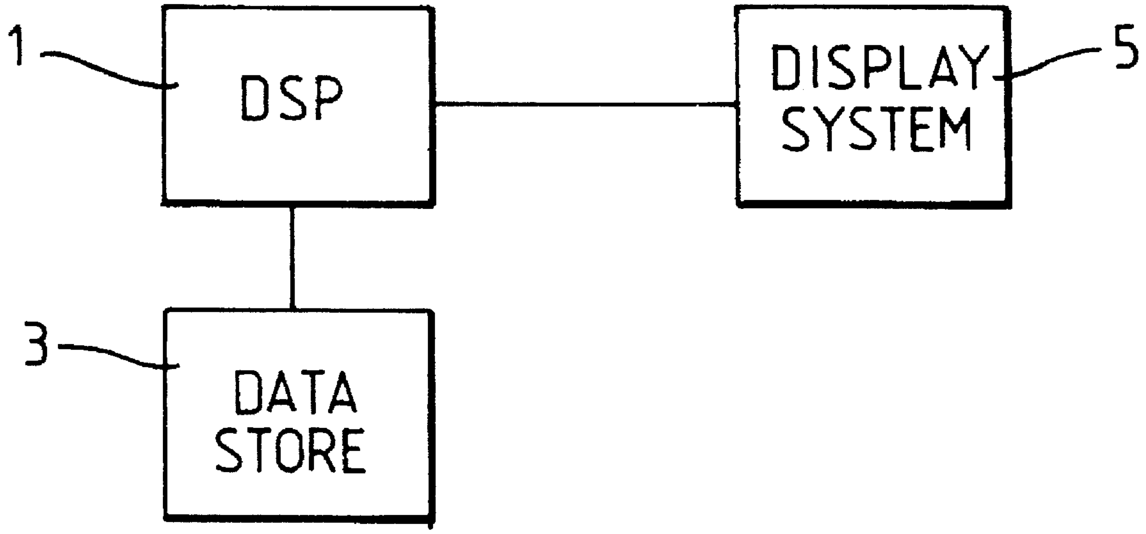
FIG. 1 is a block schematic diagram of the apparatus.

The display, the size of which is to be reduced, is that provided on a measurement instrument, which instrument applies a plurality of signals of different frequencies to a device under test and measures the amplitude of the response of the device to each applied signal. The display comprises a graph, along the horizontal axis of which is plotted the different frequencies of the signals applied, along the vertical axis of which is plotted the amplitudes of the responses of the network. The display therefore comprises a plot of data values, each of which represents the amplitude of the response of the network to an applied signal of a particular frequency.

Let there be 501 data values plotted on the graph. The plot therefore extends over 500 units on the horizontal frequency axis of the graph. The method to be described reduces the extent of the plot along the horizontal axis to 4/5 what it was before, i.e. to 400 units on the horizontal axis, by reducing the number of data values to be plotted from 501 to 401. It is to be noted here that the 4/5 reduction is achieved by plotting the reduced number of 401 data values along the horizontal axis with the same frequency as the 501 data values were plotted.

Let the 501 data values, as displayed from left to right, be denoted as follows:

S(0), S(1), S(2), S(3), S(4), S(5), S(6), S(7), S(8), S(9), S(10), . . . S(500), where S(0) is the amplitude on the vertical axis of the response at the frequency at position 0 on the horizontal axis, S(1) the amplitude at position 1, etc.

The data values following S(0) are divided up into a series of groups of 5 adjacent data values each, as follows:

S(0)/S(1), S(2), S(3), S(4), S(5)/S(6), S(7), S(8), S(9), S(10)/. . . S(500)/.

From left to right the first and fifth occurring data values in each group are selected, i.e. S(1), S(5), S(6), S(10), S(500) are selected.

One of the three unselected data values in each group, i.e. one of the second, third, and fourth occurring data values in each group, is discarded in dependence on the relative amplitudes of the three data values, i.e.[S(2) or S(3) or S(4)] and [S(7) or S(8) or S(9)] etc. are discarded, as now explained.

Let the amplitudes of the three unselected data values in each group, in the order in which the data values are displayed from left to right, be A0, A1, and A2 respectively. The relationship between the amplitudes A0, A1, A2 must fall into one of the following four categories:

(a) $A0 \leqq A1 \leqq A2$ (b) $A0 \geqq A1 \geqq A2$, $A0 \neq A1 \neq A2$ (c) $A0 > A1 < A2$ (d) $A0 < A1 > A2$.

In category (a) either all three amplitudes A0, A1, A2 are equal or there is a general rise in amplitude from left to right from the data value having amplitude A0 to the data value having amplitude A2. In category (b) there is a general fall in amplitude from left to right from the data value having amplitude A0 to the data value having amplitude A2. In category (c) of the three unselected data values the middle one has minimum amplitude. In category (d) of the three unselected data values the middle one has maximum amplitude.

Considering category (a), since either all three amplitudes A0, A1, A2 are equal or there is a general rise in amplitude from left to right, the middle data value of amplitude A1 carries the least information and may be discarded. Considering category (b), for similar reasons to those given in respect of category (a), the middle data value of amplitude A1 carries the least information and may be discarded. Considering category (c), since with the aforementioned measurement instrument it is more important to keep in the display peak or maximum amplitude data values rather than trough or minimum amplitude data values, and the amplitudes A0 and A2 in category (c) are possibly peaks or maximum amplitudes in the complete display, the middle data value of amplitude A1 is discarded. Considering category (d), the middle data value is a peak or maximum amplitude data value and therefore must be kept. In order to maintain the 'extremes' in the three unselected data values, of the data values of amplitudes A0 and A2 the one furthest from amplitude A1 is kept and the other discarded. Thus, if $|A0-A1|<|A1-A2|$ then A0 is discarded otherwise A2 is discarded.

Thus, in all categories except category (d) A1 is discarded. This allows fast processing of the data values. Further, many processors allow A0–A1 to be calculated as part of comparing A0 and A1 to see whether the condition $A0 \leqq A1$ of category (a) is satisfied. A1–A2 can be calculated similarly. Thus, should category (d) occur the test is $|A0-A1|<|A1-A2|$ to decide whether to discard A0 or A2 can be computed quickly.

Having discarded one of the three unselected data values in each group as explained above, 401 not discarded data values remain. These data values are compressed in the direction along the horizontal axis by, as mentioned above, displaying them with the same frequency along the horizontal axis as the 501 data values were displayed. The extent of the plot along the horizontal axis is thereby reduced to ⅘ its previous extent.

The above method reduces the number of data values by one in each group of 5 data values. This could be generalised to reduce groups of p data values each by one data value. The groups of p–1 data values each produced could then themselves each be reduced by one data value, and so on until groups of q data values each were produced. This would result in a reduction in the extent of the plot along the horizontal axis to q/p of the original extent.

It is to be appreciated that in the above method it is ensured that the fifth occurring data value of each group is not discarded. This in turn ensures that the data values, of the reduced number of 401 data values, displayed at the 0, 4, 8, 12, 16, . . . 400 positions on the horizontal axis are at the correct positions for the ⅘ reduction of the above method.

The apparatus for reducing the size of the display, which apparatus puts into effect the method aforedescribed including the generalisation thereof to reduce groups of p data values, will now be described.

Referring to FIG. 1, the apparatus comprises a digital signal processor (DSP) 1, a data store 3, and a display system 5. Data store 3 stores the data values the number of which is to be reduced, i.e. data store 3 stores the amplitude of the response of the device under test to each of the plurality of signals of different frequencies applied to the device under test by the measurement instrument. Data store 3 also stores the data values remaining after the discarding of data values, see below. DSP 1 takes data values from data store 3 but only returns certain thereof to data store 3, the data values not returned being the discarded data values, see below. Display system 5 displays the remaining not discarded data values stored in data store 3 with the same frequency along the horizontal axis of the display as were displayed the data values stored in data store 3 prior to the discarding of data values.

Figure 2:
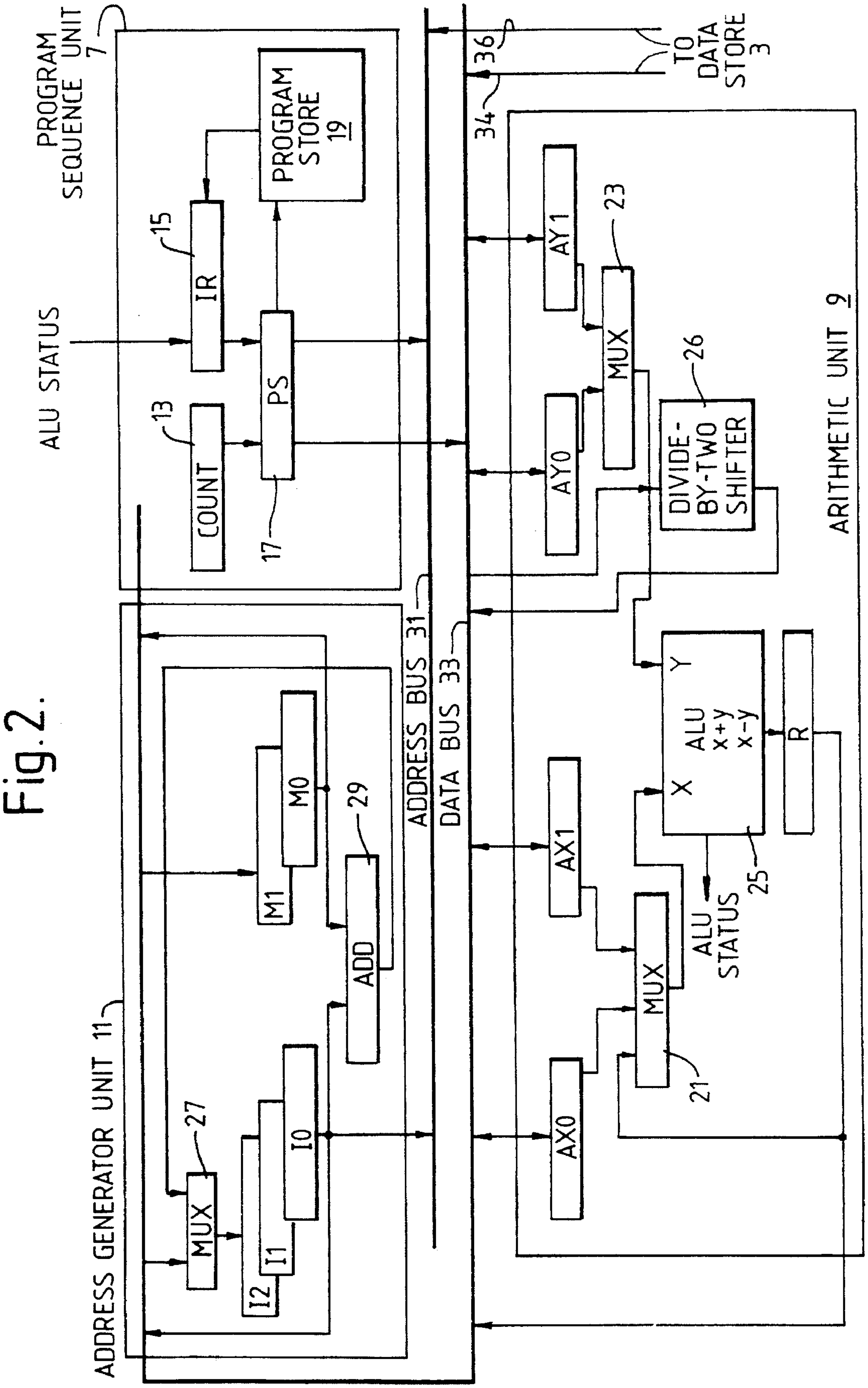
FIG. 2 illustrates in greater detail a part of the apparatus shown in FIG. 1.

Referring to FIG. 2, DSP 1 comprises a program sequence unit 7, an arithmetic unit 9, and an address generator unit 11. Program sequence unit 7 comprises a count register 13, an instruction register 15, a program sequencer 17, and a program store 19. Arithmetic unit 9 comprises input registers AX0, AX1, AY0, AY1, multiplexer units 21, 23, an arithmetic logic unit (ALU) 25, an output register R, and a divide-by-two shifter 26. Address generator 11 comprises multiplexer unit 27, address registers I0, I1, I2, address increment registers M0, M1, and an add unit 29.

DSP 1 further comprises a 14-bit address bus 31 and a 16-bit data bus 33. Data store 3 shown in FIG. 1 is connected to buses 31, 33 by connections 34, 36 and comprises a 16-bit wide RAM large enough to hold the display data values and have two spare memory locations, see below. Multiplexer units 21, 23, 27 allow one input to be selected from a group of inputs and routed to the output. Program store 19 comprises a 24-bit wide RAM.

Considering program sequence unit 7, count register 13 comprises a 16-bit register which allows program sequencer 17 to repeat instruction(s) held in program store 19 by the value held in register 13 (at the beginning of the loop, see below, register 13 is loaded with the number of iterations, at the end of each iteration it is decremented by sequencer 17 and if it does not then equal zero the instructions are repeated, otherwise the next instruction from program store 19 is performed). Program sequencer 17 decodes the instructions from instruction register 15 and generates control signals to access arithmatic unit g, address generator unit 11, data store 3, program store 19, and registers 13, 15. In essence it performs the coded instruction held in store 19, and then advances to perform the next instruction held in store 19. Examples of instructions performed are 'place value from data store 3 into register AX0 of arithmetic unit 9' and 'ask ALU 25 to perform X–Y'. Instruction register 15 accepts the next coded instruction from store 19 and passes it to sequencer 17. It also accepts the ALU 25 status information, see below, to allow sequencer 17 to perform conditional program store 19 coded instructions.

Considering arithmetic unit 9, ALU 25 accepts 16-bit data from x, y, see FIG. 2, performs arithmetic and logical operations, and stores the results in 16-bit register R. It also generates status information, ALU status (4-bit). Examples of operations performed are R=X+Y, R=X−Y with ALU status indicating if R≧0 or R<0 after the operation. Registers AX0, AX1, AY0, AY1, and R allow data to be fed to and read from ALU 25. Divide-by-two shifter 26 receives values from databus 33, divides the value by two, and allows the result to be read by databus 33.

Considering address generator unit 11, 14-bit address registers I0, I1, I2 allow sequencer 17 to access data store 3 for read and write operations. Address increment registers M0 and M1 (14-bit) allow I0, I1, I2 to be modified by either of M0 and M1, i.e. I=I+M, where I is I0, I1, or I2 and M is M0 or M1. The values in the address registers can be compared by reading the address registers into ALU 25 and performing a subtraction.

Use of the apparatus of FIGS. 1 and 2 to put into effect the method aforedescribed, including the generalisation thereof to reduce groups of p data values, will now be described.

Assume the display extends over S=p * N units on the horizontal frequency axis, where S, p and N are positive integers. Assume the reduced size display required is to extend over R=q * N units on the horizontal frequency axis, where R and q are positive integers. Let the S data stored in data store 3 be denoted as s(0), s(1), . . . s(S). The R data generated is also stored in data store 3 at the same locations as the S data, but extending only to R. Let the R data be denoted as r(0), r(1), . . . r(R). The reduction ratio is R/S=q/p.

Count register 13 is used to hold the reduction number= p−q, e.g. if S=500, R=400, then p=5, q=4 and COUNT=1. I0 is used to address the S data. I1 is used to address the R data. I1 is used to indicate the predetermined positions in each S data group. M0 is used to advance I0 and I1 to address the next data values. M1 is used to divide the S data set into a series of groups of adjacent data values (group spacing in data set S)=S/N=p data values/group, so if S=500, R=400 then p=5 and M1=5. A location in data store 3 (not used by S data set), denoted by AY1 HOLD, is used to hold an ALU 25 operation data value. A location in data store 3 (not used by S data set), denoted by S DISPLAY, is used to hold the address of the last data value to be considered for reduction.

The processing for reducing S to R is instruction coded in program store 19 according to the following sequence of steps:

0) COUNT (say C) is set to p−q.

M0 is set to 1.

M1 is set to p (the group divider).

S DISPLAY is set to the address of s(S).

1) I0 is set to address s(0).

I1 is set to address s(0) (since R data generated replaces the S data).

I2 is set to address s(d), where d addresses the centre of the first group, with p members in each group p/2 gives the centre, rounding up to the nearest data value position gives required d as:

$$d = \text{integer part of } (p-1)/2,$$

i.e.

$$d = \text{integer part of } (q+C-1)/2.$$

This is performed by manipulating arithmetic unit 9. Note for C=1, q=4, d=2, so I2 is set to address s(2).

2) Compare I0 with I2 (the predetermined position in the group marker).

As long as I0<I2 copy data from address I0 to address I1, advancing I0 and I1 by M0 after each copy.

This selects the data values having predetermined positions within each group.

By comparing I0 with S DISPLAY a check is made to see if all the S data have been considered.

If they have process is continued from step 9).

3) For the next 3 data values, at addresses I0, I0+1, I0+2, two values are selected and copied to I1 and I1+1.

The value discarded is in dependence on the relative amplitudes of the three data.

The data values at I0, I0+1, I0+2 are copied to AY0, AX1, AY1 respectively, with I0 advanced by M0 for each copy made.

Note AY0, AX1, AY1 represent A0, A1, A2 respectively in the method aforedescribed.

4) ALU 25 calculates R=AX1−AY0.

If R≦0 then category d) (A0<A1>A2) is not met, so AY0 and AY1 are copied to I1, I1+1 and I1 is advanced by M0 for each copy made. Since one data value has been discarded the process is continued from step 8).

5) R is copied to AX0.

6) ALU 25 calculates R=AX1−AY1.

If R≦0 then category d) (A0<A1>A2) is not met, so AY0 and AY1 are copied to I1, I1+1 and I1 is advanced by M0 for each copy made. Since one data value has been discarded process is continued from step 8).

7) Since no data value has been discarded by steps 4) and 6) category d) is met.

At this stage R holds |A1−A2| and AX0 holds |A1−A0| (since R and AX0 are both>0).

The comparison of R with AX0 determines whether A0 or A2 (AY0 or AY1) is discarded.

To perform this process:

AY1 is copied to AY1 HOLD,

R is copied to AY1, and ALU 25 is asked to calculate $$R = AX0 - AY1.$$

If R<0 then |A1−A0|<|A1−A2| so A0 is discarded, AX1 is copied to I1, and AY1 HOLD is copied to I1+1 (with I1 advanced by M0 after each copy).

otherwise A2 is discarded, AY0 is copied to I1, and AX1 is copied to I1+1 (with I1 advanced by M0 after each copy).

8) I2 is advanced to indicate the predetermined positions in the next group. This is done by advancing I2 by M1. Processing is now continued from step 2).

9) If all the S data have been covered then the S set is reduced by N leaving S−N data values at locations s(0), s(1), . . . s(S−N). S DISPLAY is set to the address of s(S−N) to allow another reduction by N if COUNT is not zero.

10 ) If COUNT is zero then the data has been reduced by the required amount so as to occupy locations s(0), s(1), . . . s(R), otherwise the COUNT is reduced by 1 and the process continued from step 1).

Note for S=500, R=400 the iteration required (COUNT) is only 1. The predetermined positions are 0, 1, 5, 6, 10, 11, . . . 495, 496, 500, (501). I2 will address s(2), s(7), . . . , s(497), [s(502)].

I claim:

1. A method of reducing display size of a display while substantially maintaining display information content, the display comprising a graph plot of a number of data values, the graph plot having first and second axes, each data value having an associated magnitude, said method being operative for reducing the extent of the graph plot in the direction of said first axis, said method comprising the steps of: dividing up, in the direction of said first axis, the data values into a series of groups of at least three adjacent data values each; selecting from each group at least one data value having a predetermined position within that group for the purpose of preserving the presence in the graph plot of the or each selected data value; discarding at least one not selected data value from each group in dependence on the result of a comparison of the magnitudes of the data values of that group as indicated by their relative positions in the direction of said second axis; and compressing in the direction of said first axis the graph plot of the remaining not discarded data values.

2. A method according to claim 1 wherein one not selected data value is discarded from each said group.

3. A method according to claim 2 wherein: each said group comprises five data values; and the data values occurring first and fifth in the direction of said first axis in each said group are selected as data values having predetermined positions within that group.

4. A method according to claim 3 wherein the second or third or fourth occurring data value in the direction of said first axis in each said group is discarded as follows: if the magnitude of the second is less than or equal to the magnitude of the third and the magnitude of the third is less than or equal to the magnitude of the fourth then the third is discarded; if the magnitude of the second is greater than or equal to the magnitude of the third and the magnitude of the third is greater than the magnitude of the fourth then the third is discarded; if the magnitude of the second is greater than the magnitude of the third and the magnitude of the third is less than the magnitude of the fourth then the third is discarded; and if the magnitude of the second is less than the magnitude of the third and the magnitude of the third is greater than the magnitude of the fourth then if the modulus of the result of subtracting the magnitude of the third from the magnitude of the second is less than the modulus of the result of subtracting the magnitude of the fourth from the magnitude of the third then the second is discarded otherwise the fourth is discarded.

5. A method according to claim 4 wherein: the display, the size of which is reduced by said method, is that provided on a measurement instrument and comprises a plot from left to right along a horizontal axis of 501 data values; the 500 data values following the first occurring on the horizontal axis are divided up into said groups of adjacent data values; and the step of compressing the remaining data values comprises plotting the remaining 401 data values from left to right along the horizontal axis with the same frequency as the 501 data values were plotted, said method thereby reducing the extent of the plot along the horizontal axis to ⅘ its previous extent.

6. An apparatus for reducing display size of a display while substantially maintaining display information content, the display comprising a graph plot of a number of data values, the graph plot having first and second axes, each data value having an associated magnitude, said apparatus being operative for reducing the extent of the graph plot in the direction of said first axis, said apparatus comprising: processor means arranged to divide up, in the direction of said first axis, the data values into a series of groups of at least three adjacent data values each, to select from each group at least one data value having a predetermined position within that group for the purpose of preserving the presence in the graph plot of the or each selected data value, and to discard at least one not selected data value from each group in dependence on the result of a comparison of the magnitudes of the data values of that group as indicated by their relative positions in the direction of said second axis; memory means arranged to store the data values prior to the discarding of data values and to store the data values remaining after the discarding of data values; and display means arranged to compress in the direction of said first axis the graph plot of the remaining not discarded data values.

7. An apparatus according to claim 6 wherein said processor means is arranged to discard one not selected data value from each said group.

8. An apparatus according to claim 7 wherein said processor means is arranged: to divide up the data values into said groups comprising five data values each; and to select the data values occurring first and fifth in the direction of said first axis in each said group as data values having predetermined positions within that group.

9. An apparatus according to claim 8 wherein said processor means is arranged to discard the second or third or fourth occurring data value in the direction of said first axis in each said group as follows: if the magnitude of the second is less than or equal to the magnitude of the third and the magnitude of the third is less than or equal to the magnitude of the fourth then the third is discarded; if the magnitude of the second is greater than or equal to the magnitude of the third and the magnitude of the third is greater than the magnitude of the fourth then the third is discarded; if the magnitude of the second is greater than the magnitude of the third and the magnitude of the third is less than the magnitude of the fourth then the third is discarded; and if the magnitude of the second is less than the magnitude of the third and the magnitude of the third is greater than the magnitude of the fourth then if the modulus of the result of subtracting the magnitude of the third from the magnitude of the second is less than the modulus of the result of subtracting the magnitude of the fourth from the magnitude of the third then the second is discarded otherwise the fourth is discarded.

10. An apparatus according to claim 9 wherein: the display, the size of which is reduced by said apparatus, is that provided on a measurement instrument and comprises a plot from left to right along a horizontal axis of 501 data values; said processor means is arranged to divide up the 500 data values following the first occurring on the horizontal axis into said groups of adjacent data values; and said display means is arranged to compress the remaining data values by plotting the remaining 401 data values from left to right along the horizontal axis with the same frequency as the 501 data values were plotted, said apparatus thereby reducing the extent of the plot along the horizontal axis to ⅘ its previous extent.

* * * * *